United States Patent [19]
Odajima

[11] Patent Number: 5,080,743
[45] Date of Patent: Jan. 14, 1992

[54] PROCESS FOR PREPARATION OF A WHOLLY CARBONACEOUS DIAPHRAGM FOR ACOUSTIC EQUIPMENT USE

[75] Inventor: Hideo Odajima, Fujioka, Japan

[73] Assignee: Mitsubishi Pencil Co., Ltd., Japan

[21] Appl. No.: 465,353

[22] Filed: Jan. 16, 1990

[51] Int. Cl.$^5$ .............................................. B29C 47/06
[52] U.S. Cl. ................... 156/243; 156/244.11; 156/244.18; 156/244.24; 156/264; 181/167; 181/168; 181/169; 181/170; 181/293; 181/294; 181/296
[58] Field of Search ................... 156/244.11, 243, 264, 156/244.23, 244.24, 244.18; 181/167, 168, 169, 170, 293, 294, 296

[56] References Cited

U.S. PATENT DOCUMENTS

| | | | |
|---|---|---|---|
| 4,221,773 | 9/1980 | Tsukayoshi et al. | 181/167 |
| 4,352,407 | 10/1982 | Tsukagoshi et al. | 181/167 |
| 4,471,085 | 9/1984 | Yamamoto et al. | 181/167 |
| 4,553,631 | 11/1985 | Danza | 181/296 |

FOREIGN PATENT DOCUMENTS

| | | | |
|---|---|---|---|
| 0087177 | 8/1983 | European Pat. Off. | |
| 161318 | 12/1979 | Japan | 181/169 |
| 2010637 | 6/1979 | United Kingdom | |
| 2032222 | 4/1980 | United Kingdom | |
| 2072694 | 10/1981 | United Kingdom | |

Primary Examiner—Caleb Weston
Attorney, Agent, or Firm—James A. Wong

[57] ABSTRACT

A process for preparing a wholly carbonaceous integrated diaphragm for acoustic equipment use comprises blending under application of high shearing force a mixture of one or more kinds of organic high polymeric substances carbonizable on baking and powder of graphite with crystals high elastic modulus developed therein; extrusion-molding the uniformly blended and dispersed mixture through a profile extrusion die to give a core material with orientation along the direction of the extrusion and to be cut to a desired form; independently blending and sheeting under application of high shearing force the mixture with the organic powder oriented to high degree parallel to the direction of the surface of the sheet and further passing the sheet through a calendering roll to give a skin material in the form of a film or sheet; bonding said skin material on both sides of the core material by the use of such organic liquid composition that provides high yield of carbon residue on baking and then baking the resulting unitary body in an atmosphere of inert gas after subjecting it to the treatment for making insoluble and infusible.

8 Claims, No Drawings

PROCESS FOR PREPARATION OF A WHOLLY CARBONACEOUS DIAPHRAGM FOR ACOUSTIC EQUIPMENT USE

BACKGROUND OF THE INVENTION

1. Field of the Invention

The present invention relates to a diaphragm for acoustic equipment, e.g. loudspeaker, headphone and microphone. More particularly, the present invention relates to a diaphragm which can have excellent acoustic characteristics as a diaphragm for acoustic equipment use on account of the fact that as compared with the conventional material for a diaphragm it is possessed of a high strength and a high elasticity, and moveover its weight is light and internal loss is moderate.

2. Prior Art

Generally speaking, as a diaphragm for acoustic equipment, it is desired that all of the following conditions are satisfied.

(1) The density is small.
(2) The Young's modulus is large.
(3) The velocity of propagation of long waves is large.
(4) The internal loss of vibration is moderately large.

Besides the above, when considering the following formula:

$$V = (E/\rho)^{\frac{1}{2}}$$

(wherein $V$=velocity of sound, $E$=Young's modulus, and $\rho$=density), in order to increase the velocity of sound it is required that the density is small and the Young's modulus is large.

Heretofore, as the diaphragms having a large Young's modulus use had often been made of a light metal such as aluminum, titanium, magnesium, beryllium, boron, etc.

However, the acoustic diaphragms made of aluminum, titanium, magnesium, or the like, could not obtain a fully satisfactory specific Young's modulus $E/\rho$, and the acoustic diaphragms made of beryllium, boron and others, though they could obtain an extremely large specific Young's modulus, had problems such that they cost too much more than other materials because their raw materials are not only highly expensive but also considerably difficult to carry out their industrial processing.

In view of the above-described defects of the materials of the conventional diaphragms the object of this invention is to provide a diaphragm which can have excellent acoustic characteristics by making the most of the physical characteristics of carbon.

As well-known, carbon is possessed of the physical and chemical properties widely ranging from those of crystalline carbon such as diamond or graphite to those of amorphous carbon such as carbon black, charcoal, etc.

The present inventor who made an elaborate investigation in order to make a diaphragm exhibit the aimed manihold functional characteristics by combining these carbon materials in designing so as to fit the functions required, formerly invented a process for preparation of a wholly carbonaceous diaphragm which is obtained by orienting to a high degree the crystals of the highly crystalline graphite having a high elastic modulus in the direction of the surface of the film, using resin charcoal as a binder (Japaneses Patent Application Kokai No. 23,298/1986). The diaphragm prepared in accordance with the invention proved to be a diaphragm which had excellent physical characteristics exhibiting the characteristic properties possessed by graphite as the result of the high degree orientation of the highly crystalline graphite.

The present inventor further continued the elaborate investigation for improving a diaphragm for acoustic equipment use, and thus, by paying their attention to the fact that the honeycomb structure which is recently in wide use as the structural materials in the field of the space navigator has a high specific elastic modulus as well as a high internal loss owing to the unique structure, it was led to this invention.

SUMMARY OF THE INVENTION

An object of the present invention is to provide a process for preparation of a whilly carbonaceous diaphragm characterized by its unitary structure composed of carbonaceous material, which process comprises blending 90–10 wt. % of one or more kinds of organic high polymeric substances which can be carbonized by baking with 10–90 wt. % of a powder of graphite in which crystals having a high elastic modulus have developed; extrusion-molding the thus uniformly blended and dispersed composition through a profile extrusion die after thorough kneading by applying high shearing forces so that a molded product showing orientation along the direction of the extrusion can be formed into a desired shape having a number of holes; cutting the molded product to a desired shape to be used as the core material; separately from this, thoroughly kneading the abovedescribed blended and dispersed composition by applying high shearing forces to obtain a sheet-formed composition in which the powder of graphite has been oriented to a high degree parallel to the direction of the surface of the sheet; passing the sheet through a calendering roll to give a preformed product in the form of a film or sheet having a desired thickness, which is further formed into a desired shape to be used as the skin material; bonding said skin material to both sides of the above-described core material by the use of an organic liquid composition which can show a high yield in the carbon residue by baking; and then, after subjecting the thus obtained unitary body to the treatment making it insoluble and infusible, baking the thus treated product in the atmosphere of an inert gas.

DETAILED DESCRIPTION AND THE PREFERRED EMBODIMENTS OF THE INVENTION

Now, the process for preparation of a wholly carbonaceous diaphragm for acoustic equipment use of the present invention will be explained more concretely below.

At first, 90–10% by weight, or preferably 80–20% by weight, of one or more kinds of organic high polymeric substances which can be carbonized by baking are added to 10–90% by weight, or preferably 20–80% by weight, of powder of graphite, and uniformly blended and dispersed by the use of a high speed stirrer such as a Henschel mixer, or the like. Then, the resulting mixture is kneaded by applying thereto high shearing forces, whereby as the result of the mechanochemical reaction caused by the mechanical energy there is obtainable an extrusion-moldable and thermoplastic kneaded product which is composed of fine grains of carbon whose surfaces have been physicochemically bonded with the binder capable of being carbonized by baking.

As the kneading machine for applying shearing forces use can be made of a two roll mill, a three roll mill, a pressure kneader, a Banbury mixer, a biaxial screw extruder, etc. At the time of kneading heat may also be applied, and two or more kinds of kneading machines can also be used.

As the powder of graphite used in this invention one or more kinds of graphite fines having a high crystallinity such as natural graphite, artificial graphite, Kish graphite and pyro graphite; superhigh elastic modulus graphite fiber (whisker), etc. can be selected. The suitable average particle diameter of the powder of graphite is less than 200 microns, or preferably less than 50 microns.

As the organic high polymeric substance which can be carbonized by baking use can be better made of one or more kinds selected from the group consisting of thermoplastic resins such as vinyl chloride resin, chlorinated vinyl chloride resin, polyacrylonitrile, polyvinyl alcohol, polyamide, etc.; thermosetting resins such as furan resin, phenol resin, epoxy resin, unsaturated polyester resin, etc.; natural high polymeric substances having a condensed polycyclic aromatic moiety in the basic structure of the molecule such as lignin, cellulose, tragacanth gum, gum arabic, sugars, etc.; formalin condensates; artificial high polymeric substances having a condensed polycyclic aromatic moiety in the basic structure of the molecule such as dyes of indanthrene series and intermediates thereof; pitches such as petroleum asphalt, coal tar pitch, naphtha cracked pitch, dry distillation pitches of artifical resins, etc.

Among these substances, some can hardly be given a suitable form singly, but in such a case it is better to blend one or more kinds of the above-described thermoplastic resins as a molding assistant with them.

Furthermore, for the purpose of improving either the characteristics at the time of kneading which is carried out by applying high shearing forces or the characteristics at the time of extrusion-molding, if necessary, there may be added to the blended composition one or more kinds of plasticizers or solvents such as DOP, DBP, TCP, DOA, DOS, DAP, propylene carbonate, N-methylpyrrolidone, alcohols, ketones, esters, etc. and/or one or more kinds selected from the group consisting of molding assistants such as chlorinated polyolefin, ethylene-vinyl acetate copolymer, ethylene-acryl copolymer, metallic soaps, aliphatic soaps, organotin compounds, etc.

Further, among these substances, some are also found to show that the ideal carbonization can hardly proceed, but in such a case, if after adding to the blended composition a carbonization promoting catalyst represented by a Lewis acid such as oxides of iron, nickel, and cobalt, aluminum chloride, etc. the extrusion-molded product is subjected to dehydrogenation treatment by heating, it is possible to readily produce a carbon precursor by carbonization.

Next, the above-described kneaded product is extrusion-molded through a profile extrusion die by the use of a screw type extrusion molding machine, or the like, if necessary, while heating the die head to 50–250° C., whereby there is obtained a molded product which has many holes in the desired honeycomb shape oriented along the direction of the extrusion. The molded product thus obtained is used as the core material. Then, the molded product may be cut to the desired size and shape after having been solidified by cooling, but in the case where a plasticizer or solvent was used in the blended composition, the greater part of the plasticizer or solvent is evaporated off in the atmosphere or under diminished pressure, or the molded product is subjected to the treatment making it insoluble or infusible, and thereafter cut to the desired size and shape such as plain, cone, dome, etc.

On the other hand, when the above-described kneaded product is further kneaded by the use of a kneading machine exhibiting a high shearing force such as a mixing roll, etc., there is obtained a sheet-formed product in which the powder of graphite has been oriented to a high degree parallel to the direction of the surface of the film.

Further, by passing the sheet-formed product through a calendering roll there is obtained a film or sheet having the desired thickness. In order to give the film or sheet thus obtained further orientation it may also be subjected to drawing treatment in the monoaxial or biaxial directions. The film- or sheet-formed preformed product thus obtained is, next, formed into the desired size and shape such as plain, cone, dome, etc., and heated to 50–300° C. until solidification is found to be sufficient, and then the molded product is taken out from the mold and used as the skin material.

The core and skin materials obtained by the abovedescribed procedures are treated in such a manner that while they are in the green state or after they have been subjected to the treatment making them insoluble and infusible the skin material is bonded onto both sides of the core material by the use of an organic liquid composition.

As the method for the treatment making the core and skin materials insoluble and infusible there may be mentioned the method in which the heat treatment is carried out up to 150–300° C. in the oxidizing atmospher of air, ozone, etc., the method in which the heat treatment is carried out up to 50–300° C. in the atmosphere of ammonia or a corrosive gas such as chlorine gas, etc., the method in which radiant rays are applied, and so on, but in this invention there is no particular limitation to the method for the above-described treatment.

The organic liquid composition as used herein includes thermoplastic resins such as polyvinyl chloride, chlorinated vinyl chloride resin, etc.; thermosetting resins such as phenol resin, furan resin, polyimide, etc.; natural high polymeric substances such as tragacanth gum, etc.; asphalt pitches such as petroleum asphalt, coal tar pitch, etc.; and dry distillation pitches obtainable by the dry distillation of organic high polymeric substances, and in order to strengthen the bonding between the core material and the skin material at the time of carbonization, to one or more kinds of these compositions there may be added 10–90% by weight of carbon powder such as natural graphite, artificial graphite, carbon black, coke power, charcoal powder, etc. whose average particle diameter is less than 200 nicrons, or preferably less than 50 microns.

Where the organic high polymeric substance is not liquid at ordinary temperature, it is preferred that use is made of the primary condensate of the substance, a solution dissolved in a solvent, or a heated melt.

The organic liquid composition applied between the core and skin materials is solidified by subjecting to heat treatment, solvent-removing treatment, etc. so as to effect their mutual adherence.

The unitary structure obtained by the above-described procedure is placed in a saggar for baking and carbonized by baking at a temperature of up to 1000–1500° C. in nitrogen gas or an inert gaseous phase such as argon gas, etc. In this step of carbonization by baking, in order to prevent the deformation or defects such as crack, etc. of the product it is essential to raise the temperature slowly at a heating velocity of 50° C./h. or less, or preferably 20° C./h. or less until 500° C. In the region above 500° C. heating is made at a heating velocity of 20–200° C./h., or preferably from the economical reason, 50–100° C./h., and further, for the purpose of ensuring the uniformity of the carbonization reaction, heating is continued for 1–5 hours at the maximum temperature and after allowing to cool spontaneously the baking is complete.

With reference to Examples the present invention will be explained more fully below. It should be understood, however, that the present invention is not limited thereto.

EXAMPLE 1

After 30% by weight of the primary condensate of furfuryl alcohol/furfural based resin (VF-302 produced by Hitachi Chemical Co., Ltd.) and 20% by weight of polyvinyl chloride resin (produced by Nippon Zeon Co., Ltd.; average degree of polymerization 800) were dissolved in tetrahydrofuran, 20% by weight of dibutyl phthalate was added to the resulting solution as a plasticizer to give the raw material of the carbonizing binder, which was blended with 50% by weight of natural scaly graphite (average particle size 5 microns) whose crystals had well developed, and uniformly dispersed in a kneader, and further kneaded for 40 minutes by the use of a three roll mill whose roll surfaces had been held at 125° C. The kneaded product was withdrawn and pellets for extrusion-molding were obtained therefrom by means of a pelletizing machine under a resin pressure of 120 kg/cm$^2$ while heating the die head to 120° C., whereby there was obtained a molded product 100 mm$\phi$ in diameter which had 140 circular cells, each cell being 7 mm$\phi$ in diameter.

After the molded product had been treated in an oven heated at 150° C. so as to evaporate off the greater part of DBP, it was cut to a thickness of 4 mm and heated at a heating velocity of 5° C./h. up to 180° C., which temperature was maintained for 10 hours to carry out the treatment making it insoluble and infusible.

On the other hand, the above-described kneaded product was thoroughly kneaded by means of a mixing roll whose surface temperature was held at 80° C., to obtain a sheet-formed composition in which the crystal surfaces of graphite had been highly oriented along the direction of the sheet surface.

Then, the composition was passed through a calendering roll to preform it into a film of 100 microns in thickness.

Next, the preformed film thus obtained was given tension in the biaxial directions and treated in an oven heated at 150° C. to evaporate off the greater part of DBP, after which it was cut to 95 mm$\phi$ and subjected to the treatment making it insoluble and infusible under the above-described conditions.

After separately 20% by weight of THF had been added to the above-described kneaded product, the resulting product was applied as the organic liquid composition onto both surfaces of the core material which was made insoluble and infusible by the foregoing treatment, and the skin material was bonded thereon. After THF had been evaporated off, the bonded product was heat-treated for one hour in an oven heated at 180° C.

The unitary structure thus obtained was subjected to carbonization treatment by heating in the atmosphere of nitrogen gas at a heating velocity of 10° C./h. from room temperature to 300° C., at 30° C./h. from 300° to 600° C., and at 50° C./h. from 600° to 1200° C., and after cooling the product was withdrawn.

The wholly carbonaceous honeycomb diaphragm of plain type thus produced was 90 mm$\phi$ in outer diameter, 3 mm in thickness, 6 mm$\phi$ in cell diameter, and 140 in number of cells, showing the characteristics of velocity of sound 12.1 km/sec. and internal loss 0.04.

EXAMPLE 2

After 30% by weight of resol type phenol resin (PL-2382, produced by Gun'ei Kagaku Co., Ltd.) and 20% by weight of polyvinyl formal resin (produced by Denki Kagaku Kogyo K.K., degree of formalation 74 mol %) were dissolved in a solvent, 20% by weight of dibutyl phthalate was added to the resulting solution to give the carbonizing binder, which was blended with 50% by weight of powder of natural graphite (average particle size 10 microns) whose crystals had well developed, and uniformly dispersed in a kneader. Thereafter, by processing through the same steps as in Example 1 using a monoaxial screw type extrusion-molding machine, there was obtained a molded product 200 mm$\phi$ in outer diameter which had 130 honeycomb cells each cell being 8 mm in side length. After the molded product had been treated in an oven heated at 150° C. to evaporate off the greater part of DBP it was cut to a conical shape 5 mm in thickness, and subjected to the treatment making it insoluble and infusible under the same conditions as in Example 1.

On the other hand, the kneaded product which was obtained by processing through the same steps as in Example 1 was preformed into a film 200 microns in thickness by the same procedure as in Example 1. The film is molded into a conical shape 190 mm$\phi$ in outer diameter by the use of a vacuum molding machine and heated up to 180° C. in the metal mold to partially remove the plasticizer and at the same time to promote the precuring, and then withdrawn from the mold after cooling. The molded product thus obtained was subjected to the treatment making it insoluble and infusible under the same conditions as in Example 1.

Next, 30% by weight of DBP was added to the abovedescribed kneaded product and after it had been thoroughly stirred, the resulting product was applied as the organic liquid composition onto both surfaces of the core material which was made insoluble and infusible by the foregoing treatment, and the skin material was bonded thereon. After the greater part of DBP had been evaporated off in an oven heated to 150° C., the heat treatment was further continued for one hour at 180° C.

The unitary structure thus obtained was subjected to carbonization treatment under the same conditions as in Example 1.

The wholly carbonaceous honeycomb diaphragm of cone type thus produced was 180 mm$\phi$ in outer diameter, 4.5 mm in thickness, 7 mm in side length of cell, and 150 in number of cells, showing the characteristics of velocity of sound 10.8 km/sec. and internal loss 0.05.

By comparing the characteristics of the diaphragms obtained in accordance with the present invention with those of the conventional diaphragm materials the result as shown in Table 1 was obtained.

TABLE 1

| Material | Velocity of Sound (km/sec.) | Internal Loss (tan δ) |
|---|---|---|
| Aluminum | 5.1 | 0.002-0.003 |
| Titanium | 4.9 | |
| Magnesium | 5.1 | |
| Beryllium | 12.2 | |
| Polypropylene | 1.3 | 0.06 |
| Paper (pulp) | 1.0-2.4 | 0.02-0.06 |
| Example 1 | 12.1 | 0.04 |
| Example 2 | 10.8 | 0.05 |

As readily seen from the above table, the characteristics of the diaphragms of this invention are superior to those of metallic diaphragms such as aluminum, titanium, magnesium, etc. in the velocity of sound.

Further, in tan δ the diaphragms of this invention showed high values comparable to paper or plastics. These excellent characteristics of the wholly carbonaceous honeycomb diaphragms can make them exhibit the full ability as the diaphragms especially for digital audio equipment such as the loudspeaker for use in playbacking the latest fashioned compact disk, which boast of the clear tone quality and broad dynamic range.

What is claimed is:

1. A process for preparing a wholly carbonaceous integrated diaphragm for acoustic equipment use comprising blending 90-10 wt. % of one or more kinds of organic high polymeric substances, which can be carbonized by baking, with 10-90 wt. % of powder graphite in which crystals having a high elastic modulus have developed to uniformly blend and disperse components of said polymeric substances and said powder of graphite into a mixture; applying high shearing forces to said mixture to thoroughly knead the mixture in which the powder of graphite is thereby oriented to a high degree parallel to a direction of its surface; extrusion-molding the mixture through a profile extrusion die to form a molded core member with a number of holes therein with said core member showing orientation along a direction of extrusion; cutting the molded core member to a desired shape; separately from this, thoroughly kneading the above-described blended and dispersed mixture by applying high shearing forces to obtain a sheet-formed composition in which the powder of graphite has been oriented to a high degree parallel to a direction of the surface of the sheet; passing the resulting sheet through a calendering roll to give a preformed product in the form of a film or sheet having a desired thickness, which is further formed into a desired shape to be used as a skin material; forming a unitary body by bonding said skin material to both sides of the above described core material by treating said sides with an organic liquid composition which can show a high yield in the carbon residue by baking; subjecting the thus obtained unitary body to a treatment making it insoluble and infusible; and then baking the thus treated unitary body in an inert gas atmosphere.

2. The process for preparation of a wholly carbonaceous diaphragm for acoustic equipment use according to claim 1, wherein 20-80 wt. % of powder of graphite and 80-20 wt. % of one or more kinds of organic high polymeric substances which can be carbonized by baking are blended.

3. The process for preparation of a wholly carbonaceous diaphragm for acoustic equipment use according to claim 1, wherein the powder of graphite is one or more kinds of graphite fines having a high crystallinity selected from the group consisting of natural graphite, artificial graphite, Kish graphite, pyro graphite, super-high elastic modulus graphite fiber (whisker).

4. The process for preparation of a wholly carbonaceous, diaphragm for acoustic equipment use according to claim 1, wherein an average particle diameter of the graphite is less than 200 microns.

5. The process for preparation of a wholly carbonaceous diaphragm for acoustic equipment use according to claim 4, wherein the average particle diameter of the graphite is less than 50 microns.

6. The process for preparation of a wholly carbonaceous diaphragm for acoustic equipment use according to claim 1, wherein the organic liquid composition which can show a high yield in the carbon residue by baking is made of one or more kinds selected from the group consisting of thermoplastic resins including vinyl chloride resin, chlorinated vinyl chloride resin, polyacrylonitrile, polyvinyl alcohol, polyamide, etc.; thermosetting resins including furan resin, phenol resin, epoxy resin, unsaturated polyester resin, etc.; natural high polymeric substances having a condensed polycyclic aromatic moiety in the basic structure of the molecule including lignin, cellulose, tragacanth gum, gum arabic, sugars, etc.; formalin condensates; artificial high polymeric substances having a condensed polycyclic aromatic moiety in the basic structure of the molecule including such as dyes of indanthrene series and intermediates thereof; pitches including such as petroleum asphalt, coal tar pitch, naphtha cracked pitch, dry distillation pitches of artificial resins.

7. The process for preparation of a wholly carbonaceous diaphragm for acoustic equipment use according to claim 1, wherein the organic liquid composition is one or more kinds of the composition selected from the group consisting of thermoplastic resins, thermosetting resins, natural high polymeric substances, asphalt pitches, and dry distillation pitches obtainable by the dry distillation of organic high polymeric substances.

8. The process for preparation of a wholly carbonaceous diaphragm for acoustic equipment use according to claim 1, wherein the step of carbonization by baking is carried out by raising the temperature slowly at heating velocity of 50° C./h. in a region until 500° C., and then at heating velocity of 20-200° C./h. in the region above 500° C., further heating for 1-5 hours at the maximum temperature and thereafter allowing to cool spontaneously the baking is complete.

* * * * *